United States Patent Office 3,453,099
Patented July 1, 1969

3,453,099
TREATING PLANTS WITH PHYTOTOXIC, FLUORO-SULFONATED SUBSTITUTED PHENOLS
Ivan C. Popoff, Ambler, and Reginald Lyon Whitaker, Skippack, Pa., assignors to Pennsalt Chemicals Corporation, Philadelphia, Pa., a corporation of Pennsylvania
No Drawing. Filed July 7, 1966, Ser. No. 563,357
Int. Cl. A01n 9/14
U.S. Cl. 71—103      13 Claims

ABSTRACT OF THE DISCLOSURE

Plants and plant parts are treated with a phytotoxic amount of a substituted phenol containing a sulfonyl fluoride group to effect the post emergent destruction and control of the plants.

---

This invention relates to the treatment of plants with compounds possessing phytotoxic properties. More particularly, this invention concerns a method for the destruction and control of vegetation in which the vegetation is contacted with a plant-responsive amount of a fluorosulfonated substituted phenol or derivative thereof.

In accordance with this invention vegetation is treated with a phytotoxic amount of a compound of the formula

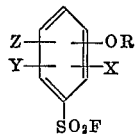

where X is selected from the group consisting of Cl, Br, F, I, OH, $OCH_3$, $CF_3$, $CCl_3$, $NO_2$, and alkyl radicals having one to eight carbon atoms; Y is selected from the group consisting of hydrogen and any of the substituents of the above X group; Z is selected from the group consisting of hydrogen and any of the substituents of the above X group; R is selected from the group consisting of hydrogen, $CH_3$,

(where Q is F, Cl, Br or I)

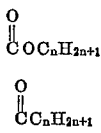

(where $n$ is an integer of 1 to 8), $$\underset{CH_2\overset{O}{\underset{\|}{C}}OR'}{}$$

(where R′ is any of the preceding R groups),

and

(where $R_1$ and $R_2$ are independently selected from the group consisting of hydrogen, alkyl radicals having 1 to 8 carbon atoms, phenyl, chlorophenyl and dichlorophenyl),

(where $R_3$ is selected from the group consisting of alkyl radicals having 1 to 8 carbon atoms, fluoroalkyl radicals containing up to 8 carbon atoms, chloroalkyl radicals containing up to 8 carbon atoms, and $NR_1R_2$); and $Sn(R'')_3$ where R″ is an alkyl radical having up to 8 carbon atoms.

Contacting plants and vegetation with a plant responsive, fluorosulfonated phenol derivative as depicted above causes, in general, leaf desiccation, leaf defoliation, growth retardation, and ultimately a kill of the plant, the degree of phytotoxic activity depending upon the type of plant and the amount of the agent applied thereto.

As indicated above, the amount of phytotoxic agent to be applied will depend upon the kind of vegetation to be treated and the density of the plants in a given area, as well as the choice of the particular compound. The agents are generally effective when applied at a rate in the range of about 0.05 to about 100 pounds per acre, however, a rate of from about 0.1 to about 10 pounds per acre is preferred.

The compounds are applied to vegetation as compositions in forms well known to the art, for example, as dispersions or emulsions in water prepared by mixing the compounds with water in presence of an emulsifying agent; as solutions in organic solvents such as acetone, dimethyl sulfoxide, phosphoric acid esters, dimethyl formamide, oil, etc., as solutions in mixtures of some of the above organic solvents with water, or as oil-in-water emulsions. The oil-in-water emulsions are obtained by first dissolving the compound in the oil and then mixing the resulting solution with water in the presence of a small amount of an emulsifying agent. Typical emulsifying agents used are of the anionic and non-ionic type such as long-chain alkyl benzene sulfonates or polyglycol ethers. The term "oil," as used in this specification, designates any liquid which is a solvent for the phytotoxic agent and which is insoluble in water, such as xylene, kerosene, diesel oil, benzene, carbon tetrachloride, heptane, and heavy mineral oils. The concentration of the plant response agent generally ranges from about 0.01% to about 10% by weight of the total formulation (i.e., the phytotoxic agent and the carrier medium).

The compounds employed in the practice of this invention are synthesized by methods well known to the chemist skilled in preparative chemistry. The following generalized reactions are illustrative.

(1) Fluorosulfonation of a substituted phenol:

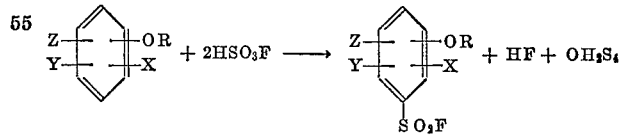

(2) Reaction of a fluorosulfonated phenol produced in (1) with an aryl, alkyl, sulfonyl, acyl, or carbamyl halide in the presence of a proton acceptor such as a tertiary amine, e.g., triethyl amine.

(3) Reaction of a fluorosulfonated phenol with an isocyanate or isothiocyanate.

(4) Reaction of a fluorosulfonated phenol with diazomethane.

EXAMPLES

The procedures for synthesizing exemplary compounds used in the practice of this invention is next described in more detail, or a reference is cited which describes a preparation. The structures of the synthesized compounds not known in the literature were verified by elemental analyses and infrared spectra.

Example 1.—3-chloro-4-hydroxybenzenesulfonyl fluoride

U.S. Patent No. 2,686,202.

Example 2.—3-chloro-4-hydroxybenzenesulfonyl chloride

U.S. Patent No. 2,686,202.

Example 3.—4-chloro-2-hydroxybenzenesulfonyl fluoride

U.S. Patent No. 2,686,202.

Example 4.—5-chloro-2-hydroxybenzenesulfonyl fluoride

U.S. Patent No. 2,686,202.

Example 5.—3,5-dichloro-2-hydroxybenzenesulfonyl fluoride 2,4-dichlorophenol (0.33 mole) is added slowly to 1.33 moles of fluosulfonic acid cooled in an ice bath. The solution is allowed to come to room temperature overnight, and then is poured onto cracked ice to give an emulsion and a water-insoluble layer which is separated therefrom. The emulsion is treated with diethyl ether as an extractive solvent; the ether extracts are combined with the water-insoluble layer; the ether is distilled off leaving a viscous residue. Sublimation of the residue gives a product (16% conversion) which is recrystallized from $CCl_4$ to give a purified product; M.P. 71–72° C.

Example 6.—3,5-dichloro-2-hydroxybenzenesulfonyl chloride 2,4-dichlorophenol (0.5 mole) is reacted with 2.5 moles of chlorosulfonic acid at room temperature. The mixture is poured onto ice and the acid layer decanted from the warmed mixture. The product (59% conversion) is washed with ice water and recrystallized from $CCl_4$; M.P. 81–83.5° C.

Example 7.—3,5-dichloro-4-hydroxybenzenesulfonyl fluoride 2,6-dichlorophenol (0.172 mole) is reacted with fluosulfonic acid (1.03 moles) at 70° C. for 1 hour. The product (62% conversion) is recrystallized from $CCl_4$ to give a light tan solid; M.P. 90.5–91.5° C.

Example 8.—2,5-dichloro-4-hydroxybenzenesulfonyl fluoride 2,5-dichlorophenol is reacted with fluosulfonic acid in accordance with the procedure of Example 7 to give the product (65% conversion); M.P. 86–88° C.

Example 9.—4-hydroxybenzenesulfonyl fluoride

W. Steinkopf, J. prakt. Chem., 117, 57 (1927).

Example 10.—(A) 2,3-dichloro-4-hydroxybenzenesulfonyl fluoride. (B) 3,4-dichloro-2-hydroxybenzenesulfonyl fluoride 2,3-dichlorophenol (0.31 mole) is added with stirring to fluosulfonic acid (1.55 moles) and poured onto ice; the precipitate is filtered off, washed with cold water, dried and recrystallized from $CCl_4$. Two crystalline products are obtained, isomer A (39.5% conversion), M.P. 135–137° C., and isomer B (9.9% conversion); M.P. 91–97° C.

The structures of the isomers are confirmed by comparing their —OH stretching frequencies in the infrared spectrum with known related compounds using known techniques.

Example 11.—3-fluoro-4-hydroxybenzenesulfonyl fluoride

Fluosulfonic acid (4.5 moles) is reacted with 2-fluorophenol (0.36 mole). The mixture is treated with ice and extracted with ether; the product is recovered from the ether solution and then crystallized from $CCl_4$ (21% conversion); M.P. 70–71° C.

Example 12.—2-fluoro-4-hydroxybenzenesulfonyl fluoride

Fluosulfonic acid is reacted with m-fluorophenol at 20–30° C. The mixture is treated with ice and the product (10% conversion) is recovered using chloroform as the extractive solvent. It is recrystallized from ether; M.P. 70–73° C.

Example 13.—2-hydroxy-5-methylbenzenesulfonyl fluoride

W. Steinkopf, supra.

Example 14.—4-hydroxy-3-methylbenzenesulfonyl fluoride

W. Steinkopf, ibid.

Example 15.—5-chloro-2-hydroxy-3-methylbenzenesulfonyl fluoride 4-chloro-2-methylphenol (0.7 mole) is reacted with fluorosulfonic acid (4.2 moles) at 45–80° C. The mixture is poured onto ice and the resulting aqueous acidic layer separated from an oily layer. The oily layer is filtered to remove by-product 3,9-dichloro-1, 7-dimethyldibenzo [1,5,2,6]-dioxadithiocin 5,11-bis(dioxide). The aqueous acidic layer is extracted with ether and the extracts are combined with the organic filtrate from above. This ether solution is washed with salt water twice and a resulting solid is filtered off and identified as by-product sodium 5-chloro-2-hydroxy-3-methylbenzenesulfonate monohydrate. The filtrate is dried and concentrated by distillation to leave an oily residue which is recrystallized from $CCl_4$ and then from hexane to give the desired product (23.2% conversion); M.P. 33–35° C.

Example 16.—3-chloro-4-hydroxy-5-methylbenzenesulfonyl fluoride 6-chloro-2-methylphenol (1.0 mole) is reacted with fluosulfonic acid (6.0 moles) at 45–80° C. and then poured onto ice. A bluish grey solid product is recovered by filtration; it is washed with water, dried and recrystallized from $CCl_4$; (44% conversion); M.P. 87–88.5° C.

Example 17.—5-chloro-2-hydroxy-4-methylbenzenesulfonyl fluoride 3-methyl-4-chlorophenol is reacted with fluosulfonic acid. The mixture is treated with ice and extracted with ether, from which the product is recovered (13% conversion); M.P. 72–73° C.

Example 18.—3-carboxy-4-hydroxybenzenesulfonyl fluoride

W. Steinkopf, J. prakt. Chem. 117, 81 (1927).

Example 19.—3-chloro-4-methoxybenzenesulfonyl fluoride o-Chloroanisole (0.5 mole) is added to fluosulfonic acid (3.0 mole) at 20–30° C. in 45 minutes. The solution is heated on a steam bath for 30 minutes, then cooled and poured on ice. The resulting emulsion is extracted with ether, and the product is recovered from the ether by evaporation, filtration and recrystallization from hexane (12% conversion); M.P. 55–56° C.

Example 20.—3,5-dichloro-4-methoxybenzenesulfonyl fluoride

Diazomethane (0.1 mole) is reacted with 3,5-dichloro-4-hydroxybenzenesulfonyl fluoride (0.07 mole) in solution in diethyl ether. When nitrogen evolution ceases, a small amount of glacial acetic acid is added to destroy the excess diazomethane. The ether is stripped to yield an orange liquid residue which is crystallized from ethanol (85% conversion); M.P. 43–45° C.

Example 21.—Ethyl-2,6-dichloro-4-fluorosulfonyl-phenoxyacetate 3,5-dichloro-4-hydroxybenzenesulfonyl fluoride (0.143 mole) in ethanol solution is treated with metallic sodium to prepare the sodium salt of the phenol derivative. This white solid is separated from the ethanol and refluxed for 40 hours in an excess of ethyl bromoacetate. The mixture is put into solution in ether, suspended solids are removed by filtration and the liquid product (43.3% conversion) is recovered by distillation; $n_D^{25}$ 1.5206, B.P.=150–155° C. at 0.5 mm. Hg.

Example 22.—3-chloro-4-acetyloxybenzenesulfonyl fluoride

To a stirred solution of 3-chloro-4-hydroxybenzenesulfonyl fluoride (0.1 mole) and triethyl amine (0.15 mole) in benzene is slowly added acetyl chloride (0.11 mole). The mixture is refluxed for 2 hours and by-product triethylamine hydrochloride is then separated by filtration. The benzene is removed from the filtrate by vacuum distillation and the product (65% conversion) is recrystallized from hexane; M.P. 58–59° C.

Example 23.—3-chloro-4-(chloroacetyloxy)-benzenesulfonyl fluoride

In a manner similar to the previous example, 3-chloro-4-hydroxybenzenesulfonyl fluoride is reacted with triethylamine and chloroacetyl chloride. The product (60% conversion) is recrystallized from a hexane-benzene mixture and then from CCl₄; M.P. 67–68° C.

Example 24.—3-chloro-4-(trichlorocetyloxy)benzenesulfonyl fluoride

This compound is obtained in 43% conversion by substituting trichloroacetyl chloride for the chloroacetyl chloride of the preceding example. The product is recrystallized from CCl₄; M.P. 76–78° C.

Example 25.—3,5-dichloro-4-acetyloxybenzenesulfonyl fluoride

This compound is obtained in 80% conversion by the reaction of 3,5-dichloro-4-hydroxybenzenesulfonyl fluoride with triethylamine and acetyl chloride; it is recrystallized from CCl₄; M.P. 100–101.5° C.

Example 26.—3,5-dichloro-4-(trichloroacetyloxy)benzenesulfonyl fluoride

This compound is obtained in 85% conversion by the reaction of 3,5-dichloro-4-hydroxybenzenesulfonyl fluoride with triethylamine and trichloroacetyl chloride. It is recrystallized from hexane; M.P. 96–98° C.

Example 27.—3-fluoro-4-acetyloxybenzenesulfonyl fluoride

To a solution of 3-fluoro-4-hydroxybenzenesulfonyl fluoride (0.2 mole) and triethylamine (0.3 mole) in benzene is added acetyl chloride (0.2 mole) at 10–15° C. The reaction mixture is stirred at reflux for 2 hours, cooled and filtered. The filtrate is stripped of benzene to yield the product (48% conversion) as a clear liquid, B.P. 84–87° C. at 0.15 mm. Hg., which on standing crystallizes to a solid, M.P. 35–36.5° C.

Example 28.—2-chloro-4-fluorosulfonylphenyl ethyl carbonate 3-chloro-4-hydroxybenzenesulfonyl fluoride is reacted with equimolar quantities of triethylamine and ethyl chloroformate. The product (83% conversion) is a liquid, $n_D^{30}$ 1.4981, B.P. 107–110° C. at 0.03 mm. Hg.

Example 29.—2,6-dichloro-4-fluorosulfonylphenyl ethyl carbonate

This compound is obtained in 79% conversion by substituting 3,5-dichloro-4-hydroxybenzenesulfonyl fluoride for the phenol derivative reactant of the previous example. The product is recrystallized from hexane; M.P. 70–72° C.

Example 30.—3-chloro-4-(p-chlorobenzoyloxy)benzenesulfonyl fluoride

This compound is obtained in 88.8% conversion by the reaction of 3-chloro-4-hydroxybenzenesulfonic fluoride with triethylamine and p-chlorobenzoyl chloride; M.P. 142–147° C.

Example 31.—3-fluoro-4-(o-chlorobenzoyloxy)benzenesulfonyl fluoride

This compound is obtained in 68% conversion by reacting 3-fluoro-4-hydroxybenzenesulfonyl fluoride with triethylamine and o-chlorobenzoyl chloride. It is recrystallized from methanol; M.P. 93–96° C.

Example 32.—3,5-dichloro-4-(o-chlorobenzoyloxy)benzenesulfonyl fluoride

This compound is produced by reacting equimolar amounts of 3,5-dichloro-4-hydroxybenzenesulfonyl fluoride, triethylamine and o-chlorobenzoyl chloride in benzene at 10–15° C. The product (86% conversion) is recrystallized from a benzene-hexane mixture; M.P. 100–102° C.

Example 33.—3-chloro-4-(o-chlorobenzoyloxy)benzenesulfonyl fluoride

This compound is obtained in 98% conversion by reacting 3-chloro-4-hydroxybenzenesulfonyl fluoride, triethylamine and o - chlorobenzoyl chloride; M.P. 53–55° C.

Example 34.—2,5-dichloro-4-(o-chlorobenzoyloxy)benzenesulfonyl fluoride

This compound is prepared in 87% conversion by substituting 2,5-dichloro-4-hydroxybenzenesulfonyl fluoride for the phenol reactant of Example 32; M.P. 143–147° C.

Example 35.—3-chloro-4-(N,N-dimethylcarbamyloxy)benzenesulfonyl fluoride 3-chloro-4-hydroxybenzenesulfonyl fluoride (0.15 mole), triethylamine (0.23 mole) and dimethylcarbamyl chloride (0.16 mole) are reacted in benzene at reflux for 4 hours. After cooling, the by-product triethylamine hydrochloride is separated by filtration and the benzene stripped from the filtrate by vacuum distillation. The product (50% conversion) is purified by recrystallization from a 1:1 ether-hexane mixture and then from petroleum ether; M.P. 89.5–91° C.

Example 36.—3,5-dichloro-4-(N,N-dimethylcarbamyloxy)benzenesulfonyl fluoride This compound is prepared in 55% conversion by substituting 3,5-dichloro-4-hydroxybenzenesulfonyl fluoride for the phenol derivative reactant of the previous example; M.P. 148–149° C.

Example 37.—3-chloro-4-(N-ethylcarbamyloxy)benzenesulfonyl fluoride 3-chloro-4-hydroxybenzenesulfonyl fluoride (0.1 mole) and ethyl isocyanate (0.12 mole) are reacted in the presence of a catalytic amount of triethylamine. The product (85% conversion) is recrystallized from a petroleum ether-benzene mixture; M.P. 96–98° C.

Example 38.—3-chloro-4-(N,N-diethylcarbamyloxy)benzenesulfonyl fluoride

Equimolar amounts of 3-chloro-4-hydroxybenzenesulfonyl fluoride, triethylamine and N,N-diethylcarbamyl chloride are reacted in benzene at reflux for 30 hours. By-product triethylamine hydrochloride is removed by filtration. The product (63.5% conversion) is recrystallized from ethanol; M.P. 55–57° C.

Example 39.—3,5-dichloro-4-(N-ethylcarbamyloxy)benzenesulfonyl fluoride

This compound is prepared in 68% conversion by reacting 3,5-dichloro-4-hydroxybenzenesulfonyl fluoride and ethyl isocyanate in the presence of a small amount of triethylamine, and recrystallizing the product from CCl₄; M.P. 127.5–128.5° C.

Example 40.—3-chloro-4-(N-phenylcarbamyloxy) benzenesulfonyl fluoride

Equimolar amounts of 3-chloro-4-hydroxybenzenesulfonyl fluoride and phenyl isocyanate are reacted using triethylamine as a catalyst. The product (64% converversion) is recrystallized from ethyl acetate; M.P. 99–104° C.

Example 41.—3-chloro-4-(N-o-chlorophenylcarbamyloxy)benzenssulfonyl fluoride

This compound is prepared in a 69% conversion by substituting 2-chlorophenyl isocyanate for the isocyanate reactant of the preceding example; M.P. 105–106° C.

In the next 6 examples, the listed compounds are prepared as in the preceding examples by reacting the appropriate substituted benzene sulfonyl fluoride and appropriate isocyanate compound.

Example 42.—3-chloro-4-(N-p-chlorophenylcarbamyloxy)benzenesulfonyl fluoride

Conversion, 66%; M.P. 141–142° C.

Example 43.—3-chloro-4-(N-m-chlorophenylcarbamyloxy)benzenesulfonyl fluoride

Conversion, 82%; M.P. 105–107° C.

Example 44.—3,5-dichloro-4-(N-m-chlorophenylcarbamyloxy)benzenesulfonyl fluoride Conversion, 58%; M.P. 92.5–93.5° C.

Example 45.—3,5-dichloro-4-(N-p-chlorophenylcarbamyloxy)benzenesulfonyl fluoride Conversion, 87%; M.P. 137–139° C.

Example 46.—3,5-dichloro-4-(N-o-chlorophenylcarbamyloxy)benzenesulfonyl fluoride Conversion, 38%; M.P. 140–142° C.

Example 47.—2-fluoro-4-fluorosulfonylphenyl-N-m-chlorophenylcarbamate

Conversion, 13%; M.P. 126–132° C.

Example 48.—3-chloro-4-(N,N-dimethylthiocarbamyloxy)benzenesulfonyl fluoride

A solution of 3-chloro-4-hydroxybenzenesulfonyl fluoride (0.15 mole), dimethylthiocarbamyl chloride (0.15 mole) and triethylamine (0.23 mole) in benzene is refluxed for 2 hours. The by-product triethylamine hydrochloride precipitate is separated from the filtrate and the product is recrystallized from hexane (65% conversion); M.P. 155–156° C.

Example 49.—3,5-dichloro-4-(N,N-dimethylthiocarbamyloxy)benzenesulfonyl fluoride This compound is produced in a 42.5% conversion by the method of the preceding example using 3,5-dichloro-4-hydroxybenzenesulfonyl fluoride as the phenol derivative reactant; M.P. 143–145° C.

Example 50.—3-chloro-4-(N,N-diethylthiocarbamyloxy)benzensulfonyl fluoride

Equimolar quantities of 3-chloro-4-hydroxybenzenesulfonyl fluoride, triethylamine and diethylthiocarbamyl chloride are reacted in benzene at reflux to prepare this product (59.5% conversion); M.P. 86.5–87.5° C.

Example 51.—3-chloro-4-hydroxy-5-nitrobenzenesulfonyl fluoride

Nitric acid (90% conc., 1.25 moles) is added to 3-chloro-4-hydroxybenzenesulfonyl fluoride at 35–45° C. The product is recrystallized from hexane (55.6% conversion); M.P. 82–83.5° C.

Example 52.—3-nitro-4-hydroxybenzenesulfonyl fluoride

W. Steinkopf, J. prakt. Chem. 117, 61 (1927).

Example 53.—3-amino-4-hydroxybenzenesulfonyl fluoride

W. Steinkopf, J. prakt. Chem. 117, 62 (1927).

Example 54.—3-amino-5-chloro-4-hydroxybenzenesulfonyl fluoride 3-chloro-4-hydroxy-5-nitrobenzenesulfonyl fluoride in ethanol solution is hydrogenated in a Parr autoclave using Raney nickel catalyst. The catalyst is separated from the solution and the product precipitated by addition of water (88.5% conversion); M.P. 115–118° C.

Example 55.—(A) 4 - hydroxy-2-methyl-3-nitrobenzenesulfonyl fluoride. (B 2-hydroxy-4-methyl-3-nitrobenzenesulfonyl fluoride Fluorosulfonic acid (1.64 moles) is added to 3-methyl-2-nitrophenol (0.33 mole) at 35–40° C. After standing overnight at room temperature, the mixture is poured onto ice, and the product is filtered off, washed with cold water and recrystallized from CCl₄ to give two crystalline fractions, isomer A (25.8% conversion), M.P. 127–129° C., and isomer B (9.7% conversion), M.P. 78–80° C. The isomeric structures are confirmed by their infrared spectra.

Example 56.—3,5 - dichloro-4-(p-nitrobenzoyloxy)benzenesulfonyl fluoride

Equimolar amounts of 3,5-dichloro-4-hydroxybenzenesulfonyl fluoride, triethylamine and p-nitrobenzoyl chloride are reacted in benzene solution at 10–15° C. for one hour. The conversion to product is 96%; M.P. 135–137° C.

The two compounds that follow are prepared in a similar manner by substituting the appropriate phenol derivative for that of the preceding reaction. The products are recrystallized from acetonitrile.

Example 57.—3-chloro-4-(p-nitrobenzoyloxy)benzenesulfonyl fluoride

Conversion, 64%; M.P. 158–160.5° C.

Example 58.—2,5-dichloro-4-(p-nitrobenzoyloxy)benzenesulfonyl fluoride

Conversion, 33%; M.P. 160–162.5° C.

Example 59.—3-chloro-4-(methanesulfonyloxy)benzenesulfonyl fluoride

Equimolar quantities of 3-chloro-4-hydroxybenzenesulfonyl fluoride, triethylamine and methanesulfonyl chloride are reacted in benzene solution at reflux. By-product triethylamine hydrochloride is filtered off and the benzene stripped from the filtrate. The product is put into solution in ethanol, treated with activated carbon and precipitated by addition of water, (64% conversion); M.P. 52–54° C.

Example 60.—3-chloro-4-(N,N-dimethylsulfamyloxy) benzenesulfonyl fluoride

Equimolar amounts of 3-chloro-4-hydroxybenzenesulfonyl fluoride, trimethylamine and N,N-dimethylsulfamyl chloride are stirred in acetonitrile solution for two hours at reflux. After cooling, the mixture is filtered and the filtrate concentrated in vacuo. The residue is water washed and recrystallized from ethanol (58% conversion); M.P. 101–102° C.

Example 61.—2,6-dichloro-4-fluorosulfonylphenoxytributyltin

A solution of sodium ethoxide (0.155 mole) in ethanol is added to an ethanol solution of 3,5-dichloro-4-hydroxybenzenesulfonyl fluoride. After 2 hours at room temperature, the ethanol is stripped off in vacuo leaving a sodium salt of the phenol derivative. This compound is suspended in toluene to which is added tributyltin chloride (0.15 mole), followed by refluxing for 8 hours. The mixture is filtered and the toluene removed from the filtrate in vacuo. The product (87.5% conversion) is a liquid, $n_D^{26}$ 1.5346.

PHYTOTOXIC ACTIVITY TESTS

The foregoing compounds were tested to determine their plant response characteristics by applying them to representative plants at typical measured rates, i.e., 0.1, 1.0 and 10 pounds of the plant response agent per acre. the defoliation and desiccation activities were determined on the Black Valentine Bean Plant. Herbicidal activity was determined by measuring the kill of six plants, specifically, the Lincoln Soy Bean, the Heavenly Blue Morning Glory, the Scarlet Globe Radish, the Clinton Oat, the Black Valentine Bean and the PI 8970 rice plant. The compounds were tested in any of three carrier media, i.e., as a dispersion in water or as a solution in oil or as a solution in acetone at concentrations of the compound ranging from about 0.01% to about 0.1% by weight of the mixture. The compounds showing the highest level of activity in each of the said plant response categories are tabulated in the following Tables I, II and III.

TABLE I.—DEFOLIATION ACTIVITY

| Example No. | Percent abcission (percent/days) at rate of— | | |
|---|---|---|---|
| | 0.1 lb./acre | 1.0 lb./acre | 10 lb./acre |
| 1 | 100/14 | | |
| 3 | | | 100/7 |
| 4 | | | 100/14 |
| 5 | | | 100/7 |
| 7 | | 75/21 | |
| 8 | | 100/21 | |
| 10(B) | | | 87/21 |
| 11 | | 100/21 | |
| 12 | | 100/14 | |
| 14 | | | 50/21 |
| 15 | | | 100/14 |
| 16 | | 87/14 | |
| 18 | | | 100/14 |
| 19 | | 50/21 | |
| 20 | | | 100/21 |
| 21 | | 50/14 | |
| 22 | | 87/14 | |
| 23 | | 87/14 | |
| 24 | | 50/21 | |
| 25 | | 50/21 | |
| 26 | | 100/21 | |
| 27 | | | 75/21 |
| 28 | | 37/21 | |
| 29 | | 87/21 | |
| 30 | | 100/21 | |
| 31 | | 50/21 | |
| 32 | | 50/21 | |
| 33 | | 87/21 | |
| 34 | | 75/21 | |
| 36 | | | 100/14 |
| 37 | | 62/21 | |
| 39 | | 50/21 | |
| 41 | | 50/14 | |
| 42 | | 62/21 | |
| 43 | | 100/21 | |
| 44 | | 62/14 | |
| 45 | | 75/14 | |
| 46 | | 50/7 | |
| 47 | | | 50/21 |
| 48 | | 100/21 | |
| 49 | | 75/21 | |
| 50 | | 62/14 | |
| 51 | | 100/21 | |
| 52 | | 50/7 | |
| 55(A) | | 87/14 | |
| 55(B) | | 75/14 | |
| 56 | | 100/14 | |
| 57 | | 50/21 | |
| 58 | | 50/21 | |
| 59 | | | 100/14 |
| 60 | | | 100/14 |
| 61 | | | 100/14 |

TABLE II.—DESICCATION ACTIVITY

| Example No. | Percent desiccation (percent/days) at rate of— | | |
|---|---|---|---|
| | 0.1 lb./acre | 1.0 lb./acre | 10 lb./acre |
| 1 | 100/2 | | |
| 3 | | | 100/1 |
| 4 | | | 100/1 |
| 5 | | | 80/4 |
| 7 | | 80/4 | |
| 8 | | 100/1 | |
| 9 | | | 100/0.125 |
| 10(A) | | 100/3 | |
| 10(B) | | 100/7 | |
| 11 | 100/1 | | |
| 12 | | | 100/1 |
| 13 | | | 100/1 |
| 14 | | | 100/3 |
| 15 | | | 100/0.125 |
| 16 | 90/4 | | |
| 17 | | | 100/1 |
| 18 | | | 100/1 |
| 19 | | | 100/1 |
| 20 | | | 100/1 |
| 21 | | | 100/0.125 |
| 22 | | 80/2 | |
| 23 | | 100/1 | |
| 24 | | 100/1 | |
| 25 | | 100/3 | |
| 26 | | 100/2 | |
| 27 | | | 100/1 |
| 28 | | 100/1 | |
| 29 | | 90/4 | |
| 30 | 50/7 | | |
| 31 | | | 100/1 |
| 32 | | 100/3 | |
| 33 | | 100/3 | |
| 34 | 70/3 | | |
| 36 | | | 100/4 |
| 37 | 60/3 | | |
| 39 | 100/7 | | |
| 40 | | 100/3 | |
| 41 | | 100/1 | |
| 42 | | 100/3 | |
| 43 | | 100/1 | |
| 44 | 100/3 | | |
| 45 | | 100/3 | |
| 46 | 80/3 | | |
| 47 | | 60/4 | |
| 48 | | 100/2 | |
| 49 | | | 100/3 |
| 50 | | 100/3 | |
| 51 | 90/3 | | |
| 52 | | 100/0.125 | |
| 55(A) | | 100/0.21 | |
| 55(B) | | 100/0.21 | |
| 56 | | 90/7 | |
| 57 | | | 100/1 |
| 59 | | | 90/3 |
| 60 | | | 100/1 |
| 61 | | 100/0.125 | |

TABLE III.—HERBICIDAL ACTIVITY

| Example No. | Rate | |
|---|---|---|
| | 0.1 lb./acre | 1.0 lb./acre |
| 1 | B | A |
| 3 | C | B |
| 4 | C | B |
| 5 | C | A |
| 7 | B | A |
| 8 | B | A |
| 10(A) | C | A |
| 10(B) | C | A |
| 11 | B | A |
| 15 | C | B |
| 16 | C | B |
| 17 | C | B |
| 19 | C | B |
| 22 | B | A |
| 23 | C | A |
| 24 | C | A |
| 25 | C | B |
| 26 | C | B |
| 28 | B | B |
| 29 | C | B |
| 32 | C | B |
| 33 | C | A |
| 34 | C | B |
| 35 | C | C |
| 37 | C | A |
| 38 | C | C |
| 39 | C | A |
| 40 | C | A |
| 41 | C | B |
| 42 | C | B |
| 43 | B | A |
| 44 | C | A |
| 45 | B | A |
| 46 | C | B |
| 47 | C | A |
| 56 | C | B |
| 61 | C | B |

Key:
A = excellent activity (ca. 80–100% kill).
B = good activity (ca. 63–79% kill).
C = moderate activity (ca. 35–62% kill).

It was surprising to find that Examples 2 and 6 (chlorosulfonated phenol derivatives), Example 9 (fluorosulfonated phenol having no other substituents) and Examples 53 and 54 (fluorosulfonated phenols having an amino substituent) showed very little phytotoxic activity when subjected to the aforedescribed plant response tests.

It is of course understood that the foregoing examples of the testing of compounds embodied in the present invention are for the purposes of clarification and illustration only and are not meant to limit the scope of the invention as defined by the appended claims.

We claim:

1. A method for the post-emergent destruction and control of plants and plant parts which comprises treating the plants with a phytotoxic amount of a fluorosulfonated phenol derivative of the formula

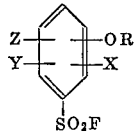

where X is selected from the group consisting of Cl, F, $CF_3$, $CCl_3$, $NO_2$, COOH and lower alkyl; Y and Z are selected from the group consisting of hydrogen and chlorine; and R is selected from the group consisting of hydrogen, $CH_3$,

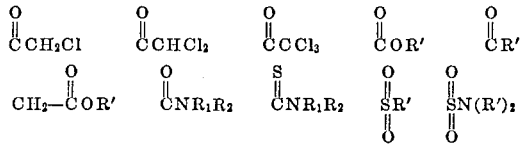

and $Sn(R')_3$ where R' is lower alkyl and $R_1$ and $R_2$ are independently selected from the group consisting of hydrogen, lower alkyl, phenyl, chlorophenyl and dichlorophenyl.

2. The method of claim 1 wherein the fluorosulfonated phenol derivative is 3-chloro-4-hydroxybenzenesulfonyl fluoride.

3. The method of claim 1 wherein the fluorosulfonated phenol derivative is 3,5 - dichloro - 4 - hydroxybenzenesulfonyl fluoride.

4. The method of claim 1 wherein the fluorosulfonated phenol derivative is 2,5 - dichloro - 4 - hydroxybenzenesulfonyl fluoride.

5. The method of claim 1 wherein the fluorosulfonated phenol derivative is 3 - fluoro - 4 - hydroxybenzenesulfonyl fluoride.

6. The method of claim 1 wherein the fluorosulfonated phenol derivative is 3 - chloro - 4 - acetyloxybenzenesulfonyl fluoride.

7. The method of claim 1 wherein the fluorosulfonated phenol derivative is 3 - chloro - 4 - (o-chlorobenzoyloxy) benzenesulfonyl fluoride.

8. The method of claim 1 wherein the fluorosulfonated phenol derivative is 3 - chloro - 4 - (N-ethylcarbamyloxy) benzenesulfonyl fluoride.

9. The method of claim 1 wherein the fluorosulfonated phenol derivative is 3,5 - dichloro - 4 - (N-ethylcarbamyloxy)benzenesulfonyl fluoride.

10. The method of claim 1 wherein the fluorosulfonated phenol derivative is 3 - chloro-4-(N-m-chlorophenylcarbamyloxy)benzenesulfonyl fluoride.

11. The method of claim 1 wherein the fluorosulfonated phenol derivative is 3,5-dichloro - 4-(N-m-chlorophenylcarbamyloxy)benzenesulfonyl fluoride.

12. The method of claim 1 wherein the fluorosulfonated phenol derivative is 3,5 - dichloro - 4-(N-p-chlorophenylcarbamyloxy)benzenesulfonyl fluoride.

13. The method of claim 1 wherein the fluorosulfonated phenol derivative is 3 - chloro - 4-ethylcarbonyldioxybenzenesulfonyl fluoride.

References Cited

UNITED STATES PATENTS

| | | |
|---|---|---|
| 2,686,202 | 8/1954 | McCoy et al. |
| 2,776,992 | 1/1957 | Gregory. |
| 2,875,123 | 2/1959 | Wygant _____ 71—103 |
| 3,085,041 | 4/1963 | Buchanan _____ 167—22 |
| 3,124,447 | 3/1964 | Wineman et al. _____ 71—103 |
| 3,129,236 | 4/1964 | Weissenberger _____ 71—97 |
| 3,186,847 | 6/1965 | Willems. |

FOREIGN PATENTS

| | | |
|---|---|---|
| 8,949 | 1961 | Japan. |
| 581,099 | 8/1959 | Canada. |

LEWIS GOTTS, *Primary Examiner.*

G. HOLLRAH, *Assistant Examiner.*

U.S. Cl. X.R.

71—72, 100; 260—429.7, 455, 456, 463, 470, 543, 479, 521